(12) United States Patent
Tanaka (10) Patent No.: US 10,895,958 B2
(45) Date of Patent: Jan. 19, 2021

(54) ELECTRONIC DOCUMENT MANAGEMENT DEVICE, ELECTRONIC DOCUMENT MANAGEMENT SYSTEM, AND ELECTRONIC DOCUMENT MANAGEMENT PROGRAM

(71) Applicant: WingArc1st Inc., Tokyo (JP)

(72) Inventor: Jun Tanaka, Tokyo (JP)

(73) Assignee: WingArc1st Inc., Tokyo (JP)

( * ) Notice: Subject to any disclaimer, the term of this patent is extended or adjusted under 35 U.S.C. 154(b) by 729 days.

(21) Appl. No.: 15/306,202

(22) PCT Filed: Aug. 17, 2015

(86) PCT No.: PCT/JP2015/072999
§ 371 (c)(1),
(2) Date: Oct. 24, 2016

(87) PCT Pub. No.: WO2010/080029
PCT Pub. Date: May 26, 2016

(65) Prior Publication Data
US 2017/0046027 A1 Feb. 16, 2017

(30) Foreign Application Priority Data
Nov. 18, 2014 (JP) .................................. 2014-233262

(51) Int. Cl.
*G06F 3/048* (2013.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01); *G06F 16/16* (2019.01); *G06F 40/12* (2020.01)

(58) Field of Classification Search
CPC .... G06F 3/0482; G06F 16/16; G06F 3/04842; G06F 3/04817; G06F 17/22
See application file for complete search history.

(56) References Cited

U.S. PATENT DOCUMENTS

2002/0091739 A1* 7/2002 Ferlitsch ............. G06F 3/04815
715/273
2005/0210076 A1* 9/2005 Rogers .................. G06F 3/0607
(Continued)

FOREIGN PATENT DOCUMENTS

JP H11-025103 A 1/1999
JP 2004-145568 A 5/2004
(Continued)

OTHER PUBLICATIONS

*Create and describe url file (internet shortcut)* [online], Feb. 5, 2012; searched on Oct. 29, 2015 (with partial English translation). (Continued)

*Primary Examiner* — Pei Yong Weng
(74) *Attorney, Agent, or Firm* — Polsinelli PC (57) ABSTRACT

There are provided a virtual file generating unit 1 for designating an optional page of an optional electronic document to generate a virtual file, an object generating unit 4 for generating an object for visualizing the virtual file, and a virtual file access unit 6 for giving access to a designated page of an electronic document designated by the virtual file selected via the object. By only execution of a simple operation for designating a specific page in the electronic document to give an instruction for generating the virtual file, the virtual file and the object are generated. By only selection of a desirable object, access to a desirable page of a desirable electronic document is automatically given without performing a work for opening a file of an original electronic document to search for a specific page.

9 Claims, 8 Drawing Sheets (51) Int. Cl.
    *G06F 16/16*     (2019.01)
    *G06F 40/12*     (2020.01)
    *G06F 3/0481*     (2013.01)
    *G06F 3/0484*     (2013.01)

(56) References Cited

U.S. PATENT DOCUMENTS

2008/0033969 A1*   2/2008   Koo .................... G06F 16/93
2014/0016162 A1    1/2014   Fukumori et al.

FOREIGN PATENT DOCUMENTS

| JP | 2004-318915 A | 11/2004 |
| JP | 2009-169537 A | 7/2009 |
| JP | 2011-039954 A | 2/2011 |
| JP | 2013-178680 A | 9/2013 |
| JP | 2014-022825 A | 3/2014 |

OTHER PUBLICATIONS

*Slightly convenient small trick in linkage of pdf on web page* [online], Jul. 19, 2008; searched on Oct. 29, 2015 (with partial English translation).

Hayama et al., *Dekiru Encyclopedia: Windows XP SP3&SP2-compliant*, first edition, Impress Corporation, Dec. 1, 2014, p. 115 (with partial English translation).

* cited by examiner

ELECTRONIC DOCUMENT MANAGEMENT DEVICE, ELECTRONIC DOCUMENT MANAGEMENT SYSTEM, AND ELECTRONIC DOCUMENT MANAGEMENT PROGRAM

CROSS REFERENCE TO RELATED APPLICATIONS

This application is a National Phase filing under 35 U.S.C. § 371 of PCT/JP2015/072999 filed on Aug. 17, 2015; and this application claims priority to Application No. 2014-233262 filed in Japan on Nov. 18, 2014, under 35 U.S.C. § 119. The entire contents of each application are hereby incorporated by reference.

TECHNICAL FIELD

The present invention relates to an electronic document management device, an electronic document management system, and an electronic document management program, and more particularly, is suitably used in a device for performing management on a page unit of an electronic document including a plurality of pages.

BACKGROUND ART

Conventionally, there is provided a technique for enabling various documents such as word processor software and text editor to be generated as electronic data (which will be hereinafter referred to as an electronic document). Herein, the electronic document includes a file format referred to as PDF (Portable Document Format) developed by Adobe Systems Incorporated.

A PDF file has a feature that it does not depend on a specific computer environment but contents of a document can be displayed in almost the same state in many environments. By utilizing this feature, an electronic document in a specific file format created by word processor software, spreadsheet software, diagram preparing software or the like to be operated depending on the computer environment is converted into a file format of PDF so that the electronic document can be read in many computer environments.

Usually, the electronic document is often constituted by a plurality of pages. Also in the case in which a specific page is to be read or printed, therefore, it is necessary to open a file of the electronic document and to find and specify a relevant one of the pages. In the case in which it is necessary to often give access to a specific page, it is troublesome to open the file and find the relevant page without omission. In this case, by extracting only a specific page and saving the page as another file, it is possible to omit a great deal of time and labor for finding and specifying the specific one of the pages without omission.

Referring to the method, however, it is necessary to save the file generated by extraction of only the specific page in addition to a file of an original electronic document. In order to generate another file having only the specific page, there is a problem in that it is necessary to perform a troublesome operation, that is, to open the file of the original electronic document, to delete an unnecessary page and to save an electronic document having only the residual specific pages in another file name.

Moreover, specific pages are selected from the electronic documents and are read or printed respectively in some cases. Also in these cases, by extracting only the specific pages from the electronic documents respectively, and coupling and saving them as another file, it is possible to omit a time and labor for searching for and specifying the relevant pages from the pages in the respective electronic documents one by one. However, the time and labor for generating, as another file, a new electronic document obtained by extracting the specific pages from the electronic documents and coupling them respectively is greater than a time and labor for extracting specific pages from a single electronic document and generating another file.

There is known the technique for dividing an electronic document into a plurality of portions on a page unit and generating and visualizing thumbnail images for the divided portions when scanning a paper document to generate the electronic document (for example, see Patent Document 1). According to the technique described in the Patent Document 1, contents of each divided page can be confirmed rapidly based on the thumbnail image.

Patent Document 1: Japanese Laid-Open Patent Publication No. 2011-39954

DISCLOSURE OF THE INVENTION

Referring to the technique described in the Patent Document 1, however, the thumbnail images are generated for all pages of the electronic document generated by the scan. For this reason, it is impossible to extract and manage only a specific page desired by a user. Moreover, it is also impossible to extract specific pages desired by the user from the electronic documents respectively and to manage them in a coupling state. In order to extract or couple only the specific pages desired by the user, accordingly, there is only a method of performing the troublesome operation described above and generating and saving another file.

The present invention has been made to solve the problems and has an object to enable easy management related to division of a specific page in an electronic document. Furthermore, it is an object of the present invention to enable easy management related to coupling of a plurality of specific pages in an electronic document.

In order to solve the problems, in the present invention, an optional page of an optional electronic document is designated and a virtual file constituted by attribute information representing a storage place, a filename and a page number of the electronic document is thus generated, and an object for visualizing the virtual file is generated and displayed. When any of the objects is selected by a user, access is given to a designated page of an electronic document designated by a virtual file based on attribute information possessed by the virtual file corresponding to the selected object.

According to the present invention having the structure described above, when a user only performs a simple operation for designating a specific page in the electronic document to give an instruction for generating a virtual file, a virtual file representing a designated page in a designated electronic document and an object for visualizing and displaying the virtual file are generated. By only execution of an operation for selecting a desirable one of the displayed objects, access to a desirable page of a desirable electronic document is automatically given without causing a user to perform a work for opening a file of an original electronic document to search for a specific page without omission.

In the case in which a user wants to extract and manage only the specific pages in the electronic document, consequently, user does not need to perform a troublesome operation for opening a file of an original electronic document to delete an unnecessary page and saving an electronic document for only a residual specific page as another file and can easily perform management related to division of the specific pages for the electronic document.

BEST MODE FOR CARRYING OUT THE INVENTION

Figure 1:
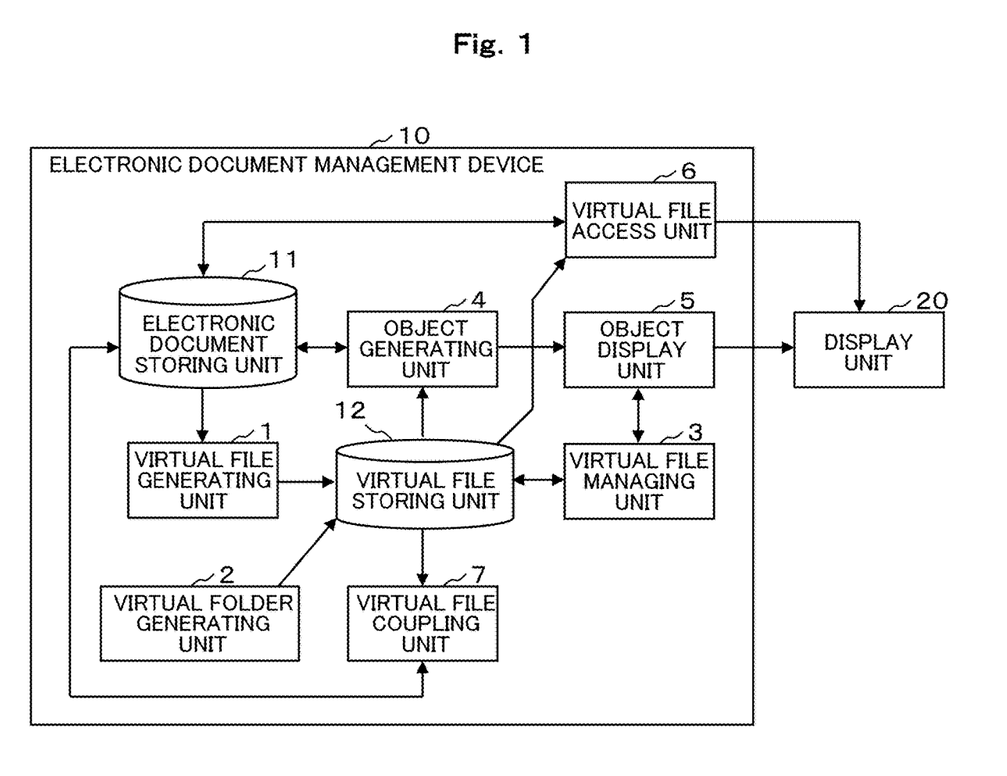
FIG. 1 is a block diagram showing an example of a functional structure of an electronic document management device according to the present embodiment.

An embodiment according to the present invention will be described below with reference to the drawings. FIG. 1 is a block diagram showing an example of a functional structure of an electronic document management device 10 according to the present embodiment. As shown in FIG. 1, the electronic document management device 10 according to the present embodiment includes, as a functional structure thereof, a virtual file generating unit 1, a virtual folder generating unit 2, a virtual file managing unit 3, an object generating unit 4, an object display unit 5, a virtual file accessing unit 6, a virtual file coupling unit 7, an electronic document storing unit 11, and a virtual file storing unit 12.

The electronic document management device 10 according to the present embodiment is mounted as a function of an electronic document management program to be installed into an information processing device such as a personal computer, a tablet terminal or a smartphone. In other words, each of the function blocks 1 to 7 shown in FIG. 1 actually includes a CPU, an RAM, an ROM and the like possessed by the information processing device and is implemented by an operation of the electronic document management program stored in a recording medium such as an RAM, an ROM, a hard disk or a semiconductor memory.

The electronic document management program according to the present embodiment can be incorporated as a plug-in into an application caused to enable a file of an electronic document to be opened and various processings (creation, edition, print or the like of a document) to be performed. However, the present invention is not restricted to this mode. In other words, the electronic document management program according to the present embodiment may be operated separately from the application for processing the file of the electronic document. Moreover, a part or all of the function blocks 1 to 7 shown in FIG. 1 can also be configured from hardware or a DSP (Digital Signal Processor).

The electronic document storing unit 11 stores a file of an electronic document. The electronic document capable of being managed in the electronic document management device 10 according to the present embodiment is created by applications of all types, for example, word processor software, spreadsheet software, graphic preparing software, business form software and the like. Moreover, it is possible to manage the electronic documents created by these applications converted into a PDF file format. In the following, description will be given to an example in which the electronic document created in the PDF is managed. Referring to the description, a file of an electronic document created in PDF will be referred to as a "PDF file".

The virtual file generating unit 1 designates an optional page of an optional PDF file from the electronic documents (PDF files) stored in the electronic document storing unit 11 to generate a virtual file constituted by attribute information representing a storage place, a file name and a page number of the PDF file. Then, the virtual file generating unit 1 stores the generated virtual file in the virtual file storing unit 12.

Although various methods can be applied to a method of designating an optional page of an optional PDF file, it is preferable to employ a method of performing an operation easily and simply. For instance, examples include a method of displaying an operating button for designating generation of a virtual file (which will be hereinafter referred to as a virtual file generating button) on a menu bar or the like when opening an optional PDF file by using an application for PDF, and designating a page which is being displayed in the PDF file opened at that time by a pressing operation through a user of the virtual file generating button.

The virtual file generating button is not restricted to a mode to be displayed on the menu bar. When the optional page of the optional PDF file is opened, for example, the virtual file generating button may be displayed by a right click operation of a mouse. Moreover, a method of designating an optional page is not always restricted to a mode for automatically designating a page which is being displayed. For example, a predetermined dialog may be displayed when the virtual file generating button is pressed down and a user may designate a desirable page in the dialog.

A method of designating an optional page of an optional PDF file is not restricted to a method to be performed when actually opening a PDF file by using an application. For example, in a position in which a file name or an icon of a PDF file to be displayed by utilizing a file system of an OS is displayed, the PDF file may be automatically designated by the right click operation of the mouse and a predetermined dialog may be displayed to designate a desirable page in the dialog. However, it is preferable to actually open an optional PDF file to designate an optional page in a display state in that the user can designate the desirable page while confirming the desirable page by eyes.

As another designating method, moreover, an optional page of an optional PDF file may be designated by a method of previously generating and saving thumbnail images for all pages of all PDF files, and displaying the thumbnail images and causing the user to select any of them. In this case, the thumbnail image can be displayed in a folder storing the PDF file when the folder is opened by the function of the OS. Alternatively, it is also possible to display an original window in accordance with the electronic document management program and to arrange and display, in a list, the thumbnail images in the original window.

According to the method of displaying the thumbnail images and causing the user to select any of them, thus, there is an advantage that a desirable page of a PDF file desired by the user can be visually confirmed and designated even if the PDF file is not opened actually. Although the individual thumbnail images have small file capacities, however, a total file capacity is increased in its own way when the thumbnail images are generated previously for all pages of all PDF files stored in the electronic document storing unit 11. Therefore, the thumbnail image generating button may be displayed depending on the right click operation of the mouse over a file name of the PDF file or an icon which is displayed by the function of the OS and the thumbnail image may be generated and displayed only for the displayed PDF file when the thumbnail image generating button is pressed down.

In the case in which the optional page of the optional electronic document is designated by any of the methods described above, the virtual file generating unit 1 generates a virtual file constituted by attribute information representing a storage place, a file name and a page number of the designated PDF file. The storage place and the file name of the PDF file are necessary information for actually enabling access to the PDF file as a substance stored in the electronic document storing unit 11. Moreover, the page number is necessary information for actually enabling access to the designated page in the PDF file to be accessed.

The virtual folder generating unit 2 generates a virtual folder for storing the virtual file generated by the virtual file generating unit 1 depending on the operation of the user for the electronic document management device 10. Then, the virtual folder generating unit 2 stores the generated virtual folder in the virtual file storing unit 12.

The virtual folder can be generated as a hierarchical type having a hierarchical structure in the same manner as a hierarchical type folder to be generated by the file system of the OS. As a method of generating a virtual folder, it is possible to apply the same method as the generation of the folder by the file system of the OS. In other words, an operating button for designating the generation of the virtual folder (which will be hereinafter referred to as a virtual folder generating button) is displayed on the menu bar or the like and the virtual folder is generated depending on the press-down operation through the user of the virtual folder generating button.

Figure 2:
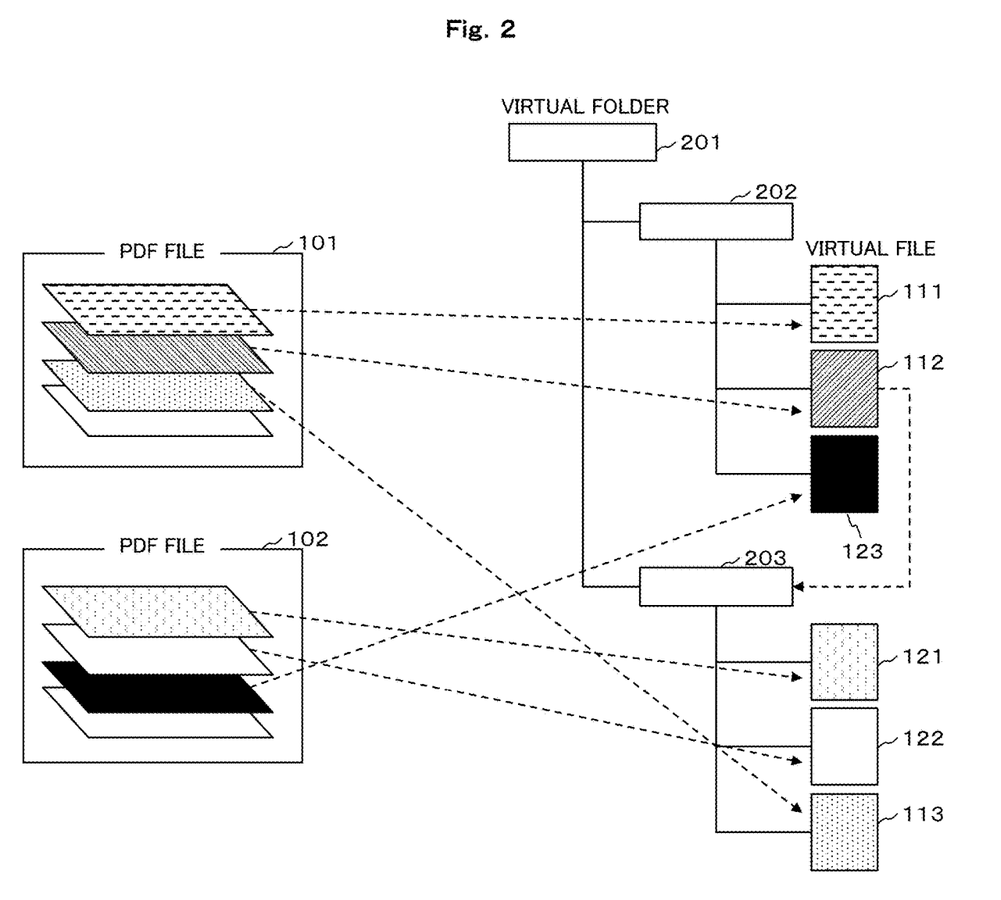
FIG. 2 is a diagram showing an example of management of a virtual file through a virtual file managing unit according to the present embodiment.

The virtual file managing unit 3 puts the virtual file generated by the virtual file generating unit 11 into the virtual folder generated by the virtual folder generating unit 2 and manages the virtual file in the virtual file storing unit 12. FIG. 2 is a diagram showing an example of the management of the virtual file through the virtual file managing unit 3. In the example of FIG. 2, there is shown a state in which a plurality of virtual files 111 to 113 and 121 to 123 are generated by the virtual file generating unit 1 from two PDF files 101 and 102 stored in the electronic document storing unit 11.

In other words, the virtual file 111 is generated from a first page of the PDF file 101, the virtual file 112 is generated from a second page, and the virtual file 113 is generated from a third page. Moreover, the virtual file 121 is generated from a first page of the PDF file 102, the virtual file 122 is generated from a second page, and the virtual file 123 is generated from a third page.

In the example of FIG. 2, moreover, there is shown a state in which three virtual folders 201 to 203 are generated by the virtual folder generating unit 2. In other words, a route folder 201 to be a first layer is generated by the virtual folder generating unit 2 and folders 202 and 203 to be second layers belonging to the route folder 201 are generated.

The virtual file managing unit 3 puts, into the folder 202 to be a second layer, the virtual files 111 and 112 generated from the first page and the second page of the PDF file 101 and the virtual file 123 generated from the third page of the PDF file 102 and manages them depending on the operation of the user for the electronic document management device 10.

Moreover, the virtual file managing unit 3 puts, into another folder 203 to be the second layer, the virtual file 113 generated from the third page of the PDF file 101, and the virtual files 121 and 122 generated from the first page and the second page of the PDF file 102 depending on the operation of the user for the electronic document management device 10.

In the present embodiment, thus, the virtual file generated by the virtual file generating unit 1 can be put into the optional virtual folder generated by the virtual folder generating unit 2 and be thus managed by the function of the virtual file managing unit 3. In the same manner as the management of the folder through the OS, moreover, it is possible to freely perform movement of the virtual file, the copy or deletion of the virtual file between the virtual folders or the like.

The object generating unit 4 generates an object for visualizing and displaying the virtual file stored in the virtual file storing unit 12 generated by the virtual file generating unit 1. The object to be generated may be an icon constituted by a combination of a predetermined mark, a file name and a page number. In order to easily understand contents in the page at first glance, however, it is preferable to generate, as an object, a thumbnail image for a designated page of a designated PDF file.

In other words, the object generating unit 4 specifies the designated page of the PDF file designated by the virtual file based on the attribute information possessed by the virtual file stored in the virtual file storing unit 12 (the storage place, the file name and the page number of the PDF file corresponding to the virtual file), and generates a thumbnail image for the specified page. The thumbnail image is generated from the actual PDF file stored in the electronic document storing unit 11.

The object display unit 5 displays the object generated by the object generating unit 4 on the display unit 20 such as a liquid crystal display in a user selectable form. More specifically, the object display unit 5 displays a window corresponding to the virtual folder to be managed by the virtual file managing unit 3, and furthermore, displays, in the window, a thumbnail image corresponding to a virtual file to be put in the virtual folder which is being displayed and to be thus managed.

Figure 3:
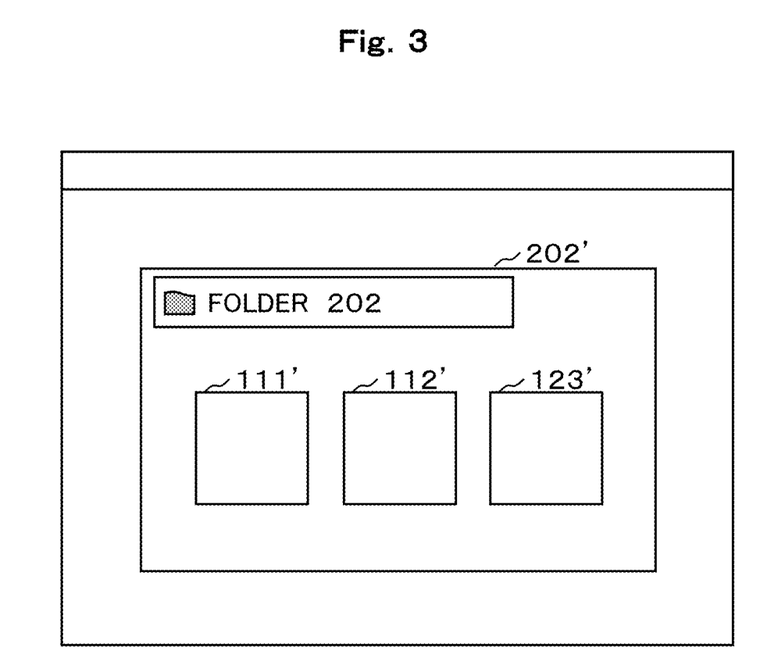
FIG. 3 is a diagram showing an example of display of an object through an object display unit according to the present embodiment.

FIG. 3 is a diagram showing an example of display of an object through the object display unit 5. In the example of FIG. 3, the object display unit 5 displays a window 202' corresponding to a virtual folder 202 for a second layer generated by the virtual folder generating unit 2, and furthermore, displays, in the window 202' of the virtual folder 202, thumbnail images 111', 112' and 123' corresponding to three virtual files 111, 112 and 123 put in the virtual folder 202 and managed therein.

The thumbnail images 111', 112' and 123' to be displayed as shown in FIG. 3 are dynamically generated when there is given an instruction for displaying the virtual folder 202 by an operation of the user for the electronic document management device 10, for example. In this case, the object generating unit 4 specifies relevant pages of the relevant PDF files 101 and 102 based on attribute information of the three virtual files 111,112 and 123 belonging to the virtual folder 202 to which the instruction for display is given, and dynamically generates the thumbnail images 111', 112' and 123' for the specified pages. Then, the object display unit 5 displays, in the window 202' of the virtual folder 202, the thumbnail images 111', 112' and 123' thus generated dynamically.

Alternatively, the following may be performed. In other words, the object generating unit 4 previously generates thumbnail images for all pages of all PDF files stored in the virtual file storing unit 12 and saves them in the virtual file storing unit 12. When an instruction for displaying the virtual folder 202 is given by the operation of the user, then, the object display unit 5 specifies the relevant pages of the relevant PDF files 101 and 102 based on the three attribute information of the three virtual files 111, 112 and 123 belonging to the virtual folder 202, and reads the thumbnail images 111', 112' and 123' of the specified pages from the virtual file storing unit 12. Then, the object display unit 5 displays the read thumbnail images 111', 112' and 123' in the window 202' of the virtual folder 202.

As in the former case, according to the method of dynamically generating a thumbnail image when an instruction for displaying a virtual folder is given, there is an advantage that a total capacity of the files to be stored in the virtual file storing unit 12 is not increased. On the other hand, as in the latter case, according to the method of previously generating thumbnail images for all pages of all PDF files and saving them in the virtual file storing unit 12, the thumbnail images can be used for reference in designation of a desirable page of a desirable PDF file by a user when generating a virtual file by the virtual file generating unit 1.

As another method, moreover, when the virtual file is generated by the virtual file generating unit 1, a thumbnail image may be generated for the designated page of the PDF file designated by the virtual file and be saved in the virtual file storing unit 12. Also in this case, when the instruction for displaying the virtual folder 202 is given by the operation of the user, the object display unit 5 specifies the relevant pages of the relevant PDF files 101 and 102 based on the attribute information of the three virtual files 111, 112 and 123 belonging to the virtual folder 202, and reads the thumbnail images 111', 112' and 123' corresponding to the relevant pages from the virtual file storing unit 12 and displays them in the window 202' of the virtual folder 202.

In the case in which the object displayed by the object display unit 5 is selected by the user, the virtual file access unit 6 gives access to the designated page of the PDF file designated by the virtual file based on the attribute information possessed by the virtual file corresponding to the selected object. For example, in the case in which the thumbnail image 111' displayed as shown in FIG. 3 is selected by a click operation of a mouse or the like, the virtual file access unit 6 gives access to a first page of the PDF file 101 designated by the virtual file 111 based on the attribute information possessed by the virtual file 111 corresponding to the selected thumbnail image 111'.

Herein, the access represents access for displaying a relevant page on the display unit 20 or access for printing the relevant page through a printer (not shown), for example. In the case in which the user double clicks the thumbnail image 111' through the mouse, for example, the virtual file access unit 6 opens the PDF file 101 designated by the virtual file 111 corresponding to the thumbnail image 111' and displays a first page on the display unit 20.

Although the description has been given to the example in which the PDF file 101 is actually opened to display the first page, the thumbnail image for the first page may be displayed. It is preferable that the thumbnail image in this case should have a higher resolution than the thumbnail image 111' to be displayed in the window 202' of the virtual folder 202.

In the case in which the user moves a mouse cursor onto the thumbnail image 111' to perform a right click operation and then selects a print button from a menu to be pull-up displayed and presses down the print button, moreover, the virtual file access unit 6 supplies, to a printer driver, information about the first page of the PDF file 101 designated by the virtual file 111 corresponding to the thumbnail image 111' and controls to print the first page of the PDF file 101 through the printer.

The virtual file coupling unit 7 couples a plurality of virtual files generated by the virtual file generating unit 1 and stored in the virtual file storing unit 12 to generate a PDF file having a plurality of pages depending on the operation of the user for the electronic document management device 10. Then, the virtual file coupling unit 7 stores the generated PDF file in the electronic document storing unit 11. At this time, the user can optionally designate a folder to be stored (an actual folder managed by an OS).

Figure 4:
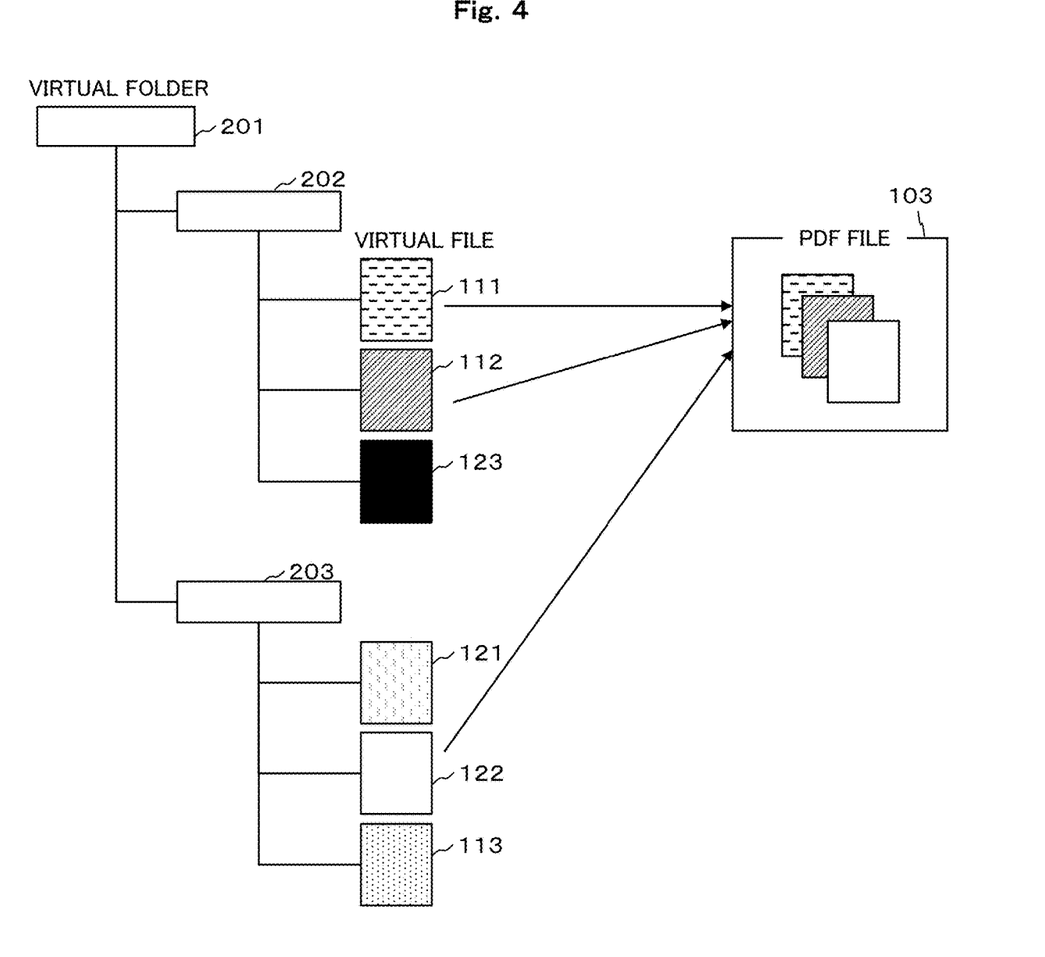
FIG. 4 is a diagram showing an example of coupling of a virtual file through a virtual file coupling unit according to the present embodiment.

FIG. 4 is a diagram showing an example of the coupling of the virtual file through the virtual file coupling unit 7. In the example of FIG. 4, the virtual file coupling unit 7 couples the virtual file 111 for the first page and the virtual file 112 for the second page which are generated from the PDF file 101 and the virtual file 122 for the second page which is generated from another PDF file 102, thereby generating the new PDF file 103 constituted by three pages.

At this time, the virtual file coupling unit 7 specifies the designated pages of the PDF files 101 and 102 designated by the virtual files 111, 112 and 122 based on the attribute information possessed by the virtual files 111, 112 and 122, and actually extracts the specified pages to generate the new PDF file 103. In other words, the virtual file coupling unit 7 actually extracts the first page and the second page from the PDF file 101, and furthermore, actually extracts the second page from another PDF file 102 and couples them to generate the new PDF file 103.

As shown in FIG. 4, in the present embodiment, it is possible to designate and couple a plurality of desirable virtual files from a plurality of virtual folders 202 and 203. As a matter of course, it is also possible to designate and couple the desirable virtual files from a single virtual folder.

The virtual file coupling unit 7 may couple the virtual files, thereby generating another virtual file constituted by a plurality of pages. At this time, the user can optionally designate a virtual folder for storing a new virtual file. In the case in which the virtual file constituted by a plurality of pages is generated, thus, the virtual file has attribute information for each page.

In this case, the object generating unit 4 generates a thumbnail image based on attribute information for one specific page in the attribute information possessed by a virtual file having a plurality of pages as an object for visualizing and displaying the virtual file having the pages. One specific page can be set to be a first one of pages possessed by the virtual file, for example. When a virtual file constituted by a plurality of pages is to be generated, alternatively, the user may optionally designate the one specific page.

Figure 5:
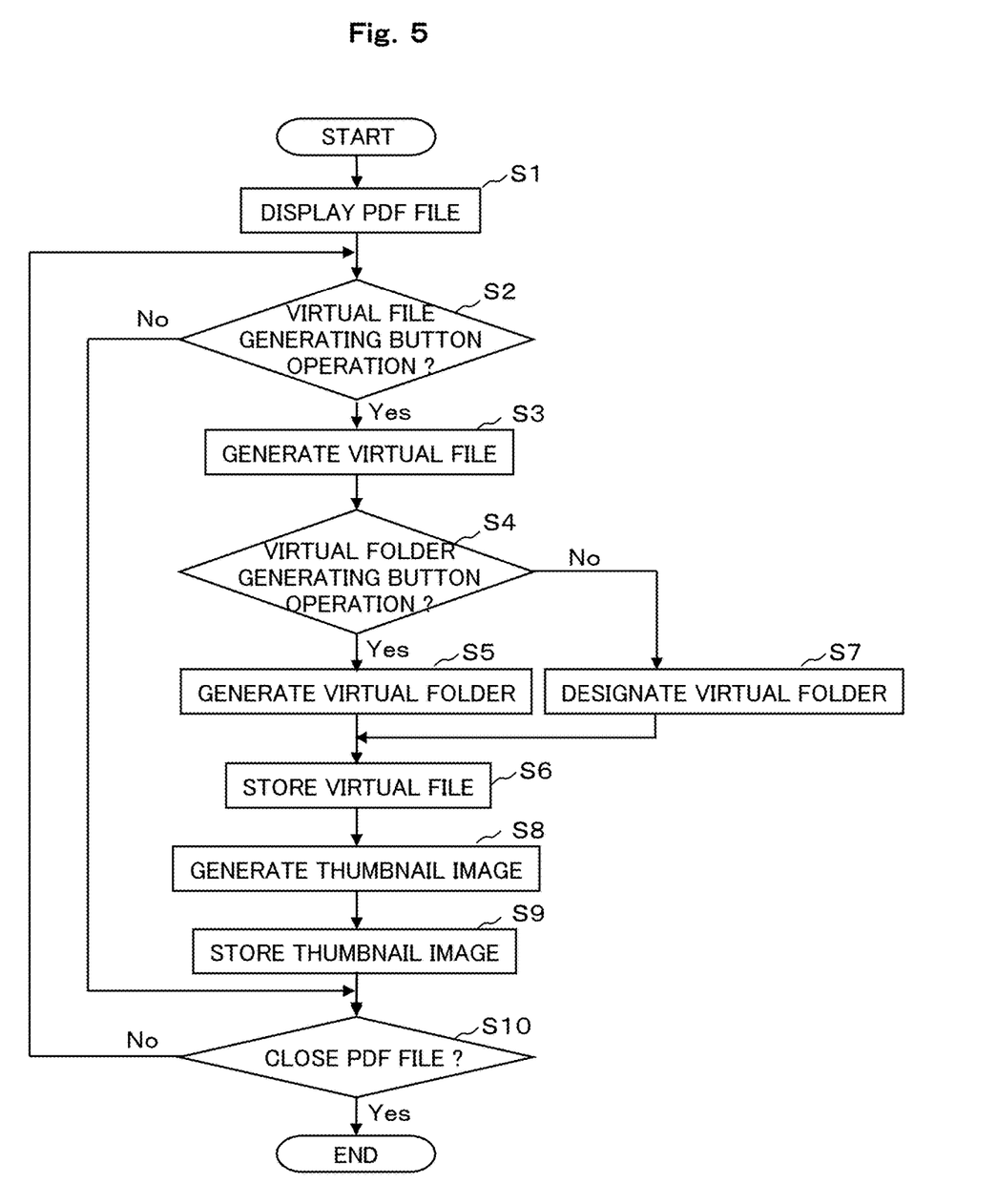
FIG. 5 is a flowchart showing an example of an operation of the electronic document management device according to the present embodiment.
Figure 6:
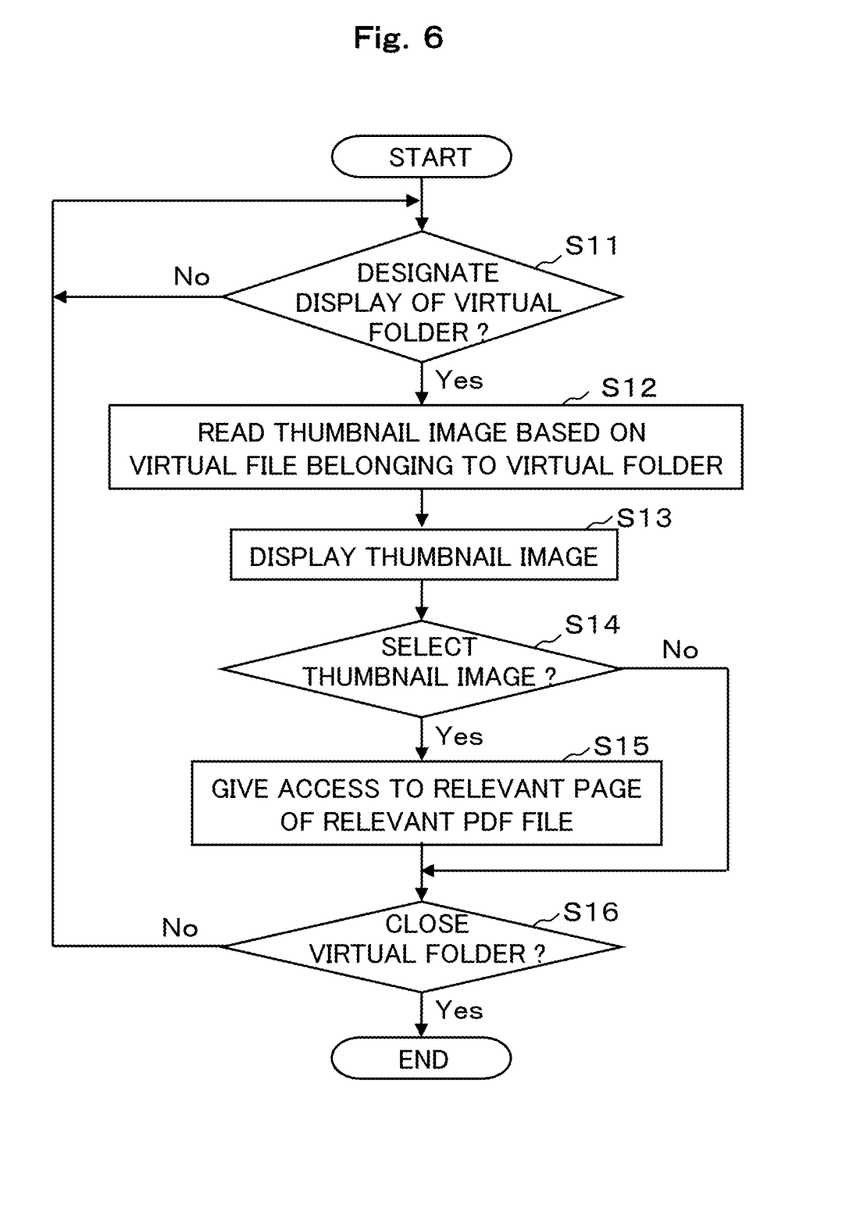
FIG. 6 is a flowchart showing an example of the operation of the electronic document management device according to the present embodiment.

FIGS. 5 and 6 are flowcharts showing an example of an operation of the electronic document management device 10 having the structure described above. FIG. 5 is a flowchart showing an example of an operation in the generation of a virtual file and a virtual folder. On the other hand, FIG. 6 is a flowchart showing an example of an operation in selection of a corresponding object (thumbnail image) to the generated virtual file and access to the PDF file.

In FIG. 5, first of all, an application for PDF opens a PDF file designated by the user and displays the PDF file on the display unit 20 (Step S1). When an optional page of the PDF file is displayed, then, the virtual file generating unit 1 decides whether an operation for pressing down a virtual file generating button is performed or not (Step S2). If the operation for pressing down the virtual file generating button is not performed, the processing makes a transition to Step S10. On the other hand, if the operation for pressing down a virtual file generating button is performed, the virtual file generating unit 1 designates a page which is being displayed in the PDF file opened at that time and generates a virtual file (Step S3).

Subsequently, the virtual folder generating unit 2 decides whether the operation for pressing down a virtual folder generating button is performed in order to generate a virtual folder for storing the virtual file generated as described above (Step S4). If the operation for pressing down a virtual folder generating button is performed, the virtual folder generating unit 2 generates a new virtual folder (Step S5). Then, the virtual file generating unit 1 stores, in the virtual file storing unit 12, the virtual file generated in Step S3 (Step S6). At this time, the virtual file managing unit 3 puts the virtual file in the virtual folder generated newly in Step S5 and mages the virtual file.

On the other hand, if it is decided that the operation for pressing down a virtual folder generating button is not performed in the Step S4, the virtual file managing unit 3 designates any of the existing virtual folders as a virtual folder for storing the virtual file generated in the Step S5 depending on the operation of the user (Step S7). When the virtual folder is designated, the virtual file generating unit 1 stores, in the virtual file storing unit 12, the virtual file generated in the Step S3 (Step S6). In this case, the virtual file managing unit 3 puts a virtual file in the virtual folder designated in the Step S7 and manages the virtual file.

After the virtual file is stored in the virtual file storing unit 12, the object generating unit 4 generates a thumbnail image for the designated page of the PDF file designated by the virtual file as an object for visualizing and displaying the virtual file (Step S8). Then, the object generating unit 4 stores the generated thumbnail image in the electronic document storing unit 11 (Step S9). A place for storage is the same as a storage place (a folder) for a corresponding PDF file.

Then, the application for PDF decides whether the operation for closing the opened PDF file is performed or not (Step S10). If the operation for closing a PDF file is not performed, the processing returns to the Step S2. On the other hand, if the operation for closing a PDF file is performed the processing of the flowchart shown in FIG. 5 is ended.

In FIG. 6, first of all, the object display unit 5 decides whether an operation for displaying an optional virtual folder is performed or not (Step S11). If the operation is not performed, the decision processing of the Step S11 is continuously performed. On the other hand, if the operation is performed, the object display unit 5 specifies a relevant page of a relevant PDF file based on attribute information of a virtual file belonging to a virtual folder to which an instruction for display is given, and reads a thumbnail image for the specified page (which is stored in the Step S9 of FIG. 5) (Step S12). Then, the object display unit 5 displays, on the display unit 20, a window corresponding to the virtual folder to which an instruction for display is given and furthermore, displays, in the window, the thumbnail image read in the Step S12 (Step S13).

Next, the virtual file access unit 6 decides whether any of the thumbnail images displayed by the object display unit 5 is selected by the user or not (Step S14). If the selection of the thumbnail image is not performed, the processing makes a transition to Step S16. On the other hand, if any of the thumbnail images is selected, the virtual file access unit 6 gives access to the designated page of the PDF file designated by the virtual file based on the attribute information possessed by the virtual file corresponding to the selected thumbnail image (Step S15). In other words, there is performed a processing for displaying a relevant page on the display unit 20 or printing the relevant page by a printer depending on the operation of the user when the thumbnail image is selected.

Thereafter, the object display unit 5 decides whether the operation for closing a virtual folder which is being displayed is performed or not (Step S16). If the operation for closing the display of the virtual folder is not performed, the processing returns to the Step S11. On the other hand, if the operation for closing display of the virtual folder is performed, the processing of the flowchart shown in FIG. 6 is ended.

Figure 7:
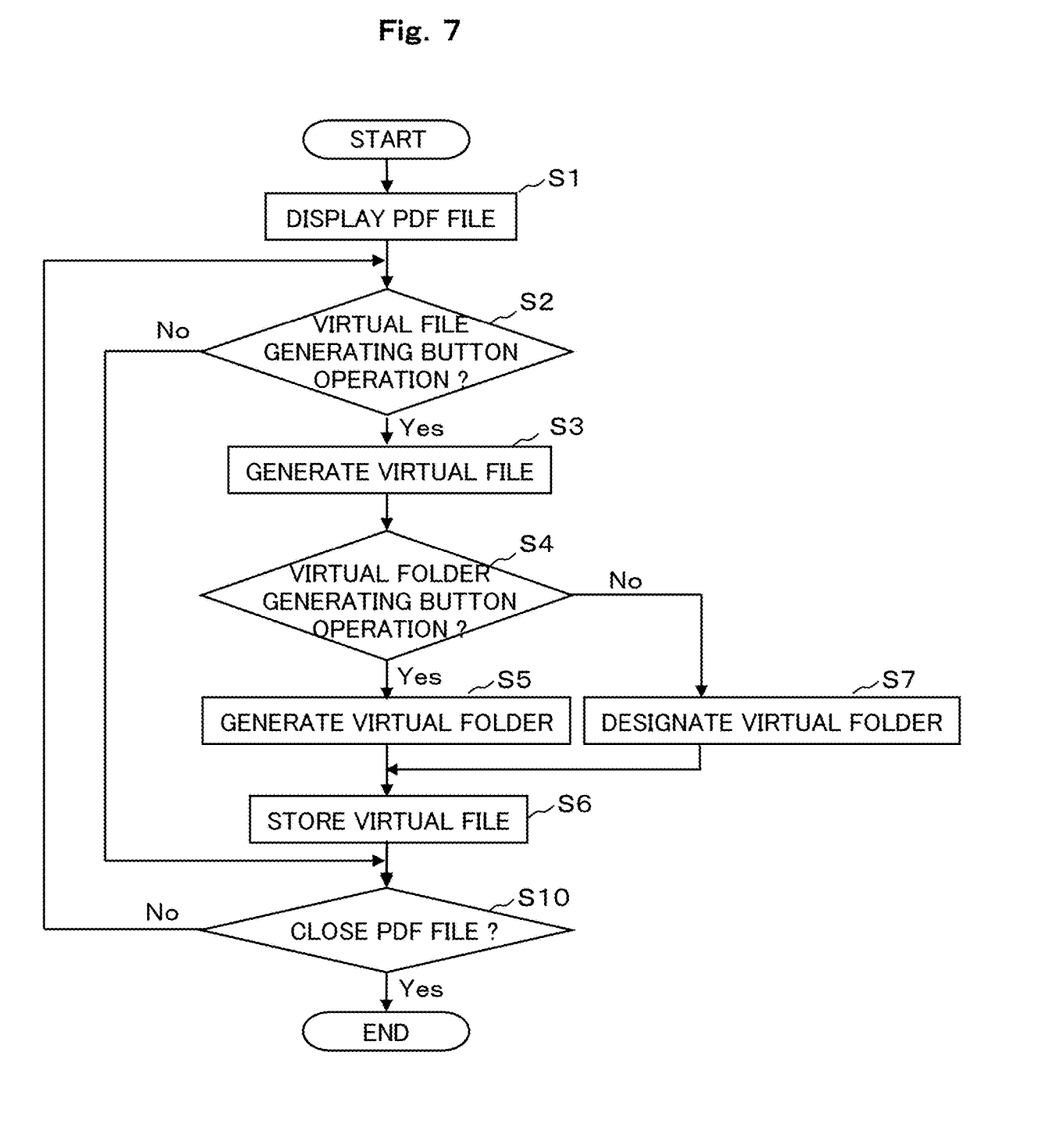
FIG. 7 is a flowchart showing another example of the coupling of the electronic document management device according to the present embodiment.
Figure 8:
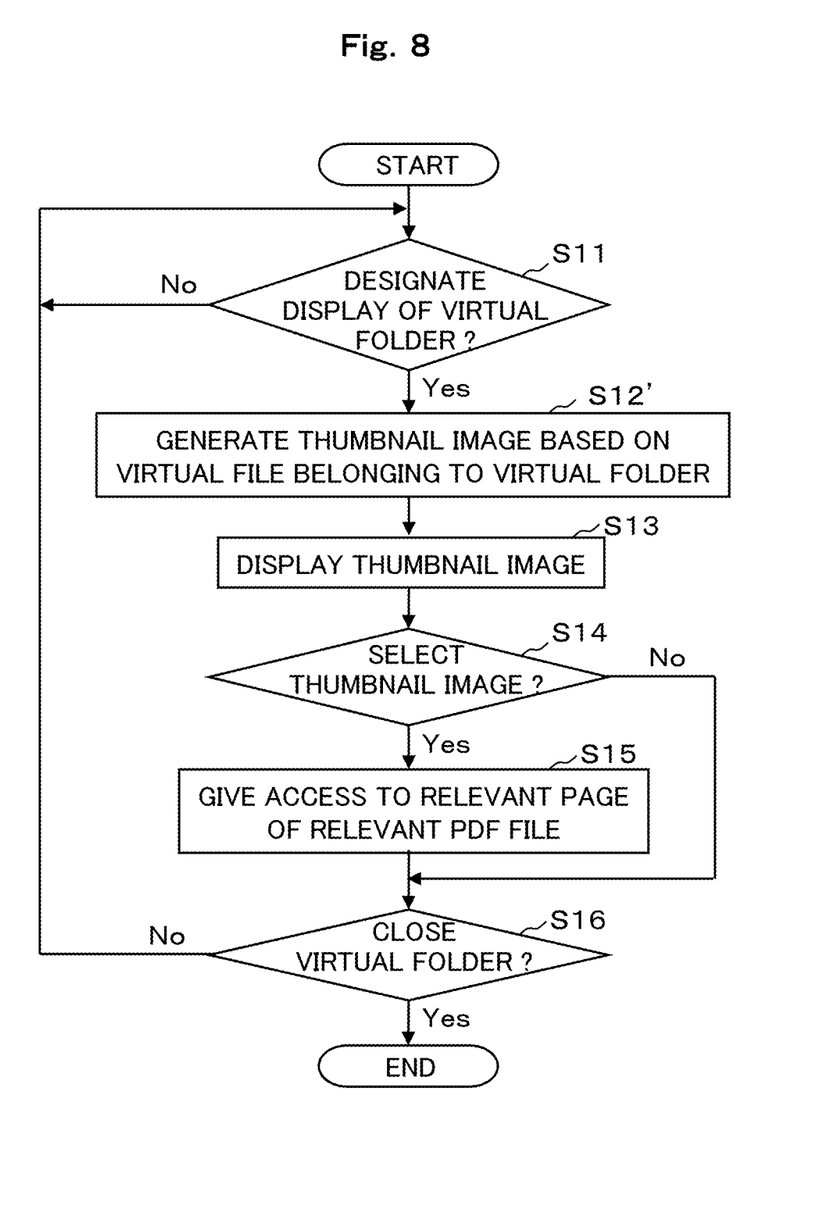
FIG. 8 is a flowchart showing a further example of the operation of the electronic document management device according to the present embodiment.

FIGS. 7 and 8 are flowcharts showing another example of the operation of the electronic document management device 10 according to the present embodiment. FIG. 7 is a flowchart showing an example of an operation in the generation of a virtual file and a virtual folder. On the other hand, FIG. 8 is a flowchart showing an example of an operation in selection of an object (a thumbnail image) corresponding to the generated virtual file to give access to a PDF file.

In FIG. 7, since the same step numbers as the step numbers shown in FIG. 5 perform the same processings, repetitive description will be omitted. The flowchart of FIG. 7 has no processing of the Steps S8 and S9 shown in FIG. 5. In other words, when the virtual file is generated by the virtual file generating unit 1, an object (a thumbnail image) for visualizing and displaying the virtual file is not generated.

In FIG. 8, since the same step numbers as the step numbers shown in FIG. 6 perform the same processings, repetitive description will be omitted. In the flowchart shown in FIG. 8, the processing of Step S12' is performed in place of the processing of the Step S12 shown in FIG. 6. In the Step S12', the object generating unit 4 specifies a relevant page of a relevant PDF file based on the attribute information of the virtual file belonging to the virtual folder to which the instruction for display is given in the Step S11, and generates a thumbnail image for the specified page. Then, the object display unit 5 displays, on the display unit 20, a window corresponding to the virtual folder to which the instruction for display is given, and furthermore, displays, in the window, the thumbnail image generated in the Step S12' (Step S13).

In the case of an example in which thumbnail images are previously generated for all pages of all PDF files stored in the virtual file storing unit 12 and are saved in the virtual file storing unit 12, the processing is obtained in a combination of the flowchart shown in FIG. 7 and the flowchart shown in FIG. 6.

In other words, when the virtual file is generated by the virtual file generating unit 1, the object (the thumbnail image) for visualizing and displaying the virtual file has already been stored in the virtual file storing unit 12. For this reason, the thumbnail image is not generated after the Step S6 as shown in FIG. 7 (The processings of the Steps S8 and S9 in FIG. 5 are not required).

On the other hand, if the operation for displaying an optional virtual folder is performed as shown in FIG. 6 (Step S11: Yes), the object display unit 5 specifies a relevant page of a relevant PDF file based on the attribute information of the virtual file belonging to the virtual folder to which the instruction for display is given, and reads a thumbnail image for the specified page (which is prestored in the virtual file storing unit 12) (Step S12). Then, the object display unit 5 displays, on the display unit 20, a window corresponding to the virtual folder to which the instruction for display is given, and furthermore, displays, in the window, the thumbnail image read in the Step S12 (Step S13).

FIGS. 5 and 7 show the example of the processing for generating the virtual file during the display of the PDF file. As described above, the method of designating an optional page of an optional PDF file to generate a virtual file is not restricted to a method to be performed when actually opening a PDF file.

As described above in detail, in the present embodiment, an optional page of an optional PDF file is designated and a virtual file constituted by attribute information representing a storage place, a filename and a page number for the PDF file is thus generated and furthermore, an object (for example, a thumbnail image) for visualizing and displaying the virtual file is generated and displayed. In the case in which any of the objects is selected by the user, access is given to the designated page of the designated PDF file based on attribute information possessed by a virtual file corresponding to the selected object.

According to the electronic document management device 10 in accordance with the present embodiment having such a structure, when the user only performs a simple operation for designating a specific page in a PDF file to give an instruction for generating a virtual file, a virtual file representing the designated page in the designated PDF file and an object for visualizing and displaying the virtual file are generated. By only execution of an operation for selecting a desirable one of the displayed objects, access to a desirable page of a desirable PDF file is automatically given by causing the user not to perform a work for opening an original PDF file to search for a specific page without omission.

In the case in which the user wants to extract and manage only the specific page in the PDF file, consequently, it is possible to easily perform management related to division of the specific page in the PDF file without requiring to perform a complicated operation for opening an original PDF file to delete unnecessary pages and saving an electronic document for only residual specific pages as another PDF file.

Moreover, the electronic document management device 10 according to the present embodiment also has a function for coupling a plurality of virtual files to generate a PDF file having a plurality of pages (or a virtual file having a plurality of pages). By this function, in the case in which the user wants to extract desirable pages in PDF files and to manage them in combination, it is also possible to easily perform management related to the coupling of the pages included in the PDF files without requiring to perform the complicated operation for opening the PDF files respectively to delete unnecessary pages, and coupling the residual specific pages and saving them as another PDF file. In other words, it is possible to freely create a PDF file having a plurality of pages by optionally combining the virtual files generated easily.

Although the description has been given by taking the PDF file as an example of the file of the electronic document in the embodiment, the file which can be managed in the electronic document management device 10 according to the present embodiment is not restricted to the PDF file as described above.

Although the description has been given to the example in which the thumbnail image corresponding to the virtual file belonging to the virtual folder is displayed in the window corresponding to the virtual folder when the virtual file generated by the virtual file generating unit 1 is to be displayed on the display unit 20 in the embodiment, moreover, the present invention is bit restricted thereto. For example, an object (an icon or a thumbnail image) corresponding to a virtual file belonging to a virtual folder may be displayed depending on a configuration of tree display of a hierarchy.

Although the description has been given to the structure in which the information processing device includes the respective function blocks 1 to 7, 11 and 12 shown in FIG. 1 in the embodiment, moreover, the present invention is not restricted thereto. For example, in a system configured to enable coupling of an information processing device (a terminal) and a server through a communication network, the server may include a part of the respective function blocks 1 to 7, 11 and 12. For example, the server may include the virtual file generating unit 1, the virtual folder generating unit 2, the virtual file managing unit 3, the object generating unit 4, the virtual file access unit 6, the virtual file coupling unit 7 and the virtual file storing unit 12.

In addition, the embodiment is only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION

1 virtual file generating unit
2 virtual folder generating unit
3 virtual file managing unit
4 object generating unit
5 object display unit
6 virtual file access unit
7 virtual file coupling unit
11 electronic document storing unit
12 virtual file storing unit

The invention claimed is:

1. An electronic document management device comprising:
 a virtual file generating unit for designating an optional page of an optional electronic document as selected by a user to generate a virtual file constituted by attribute information representing a storage place of the optional electronic document, a file name of the optional electronic document and a page number of the optional page of the optional electronic document;
 an object generating unit for previously generating and storing, in a virtual file storing unit, objects for visualizing and displaying the virtual files, for all pages of all the electronic documents stored in an electronic document storing unit;

an object display unit for displaying the objects previously stored in the virtual file storing unit on a display unit in a user selectable form; and a virtual file access unit for giving access to the optional page of the optional electronic document designated by the virtual file based on the attribute information possessed by the virtual file by selecting the object corresponding to the optional page from among the objects displayed by the object display unit, wherein:

the virtual file generating unit accepts designation of an optional page in an optional electronic document to generate the virtual file when an object, of which the virtual file is not generated, is selected by a user from among the objects displayed by the object display unit.

2. The electronic document management device according to claim 1, further comprising:

a virtual folder generating unit for generating a virtual folder; and a virtual file managing unit for putting the virtual file generated by the virtual file generating unit in the virtual folder generated by the virtual folder generating unit and managing the virtual file.

3. The electronic document management device according to claim 1, wherein the object generating unit generates, as the object, a thumbnail image for a designated page of a designated electronic document.

4. The electronic document management device according to claim 2, wherein the object generating unit generates, as the object, a thumbnail image for a designated page of a designated electronic document, and the object display unit displays a window corresponding to the virtual folder generated by the virtual folder generating unit and displays, in the window, the thumbnail image corresponding to the virtual file put in the displayed virtual folder and managed by the virtual file managing unit.

5. The electronic document management device according to claim 1, further comprising:

a virtual file coupling unit for coupling the virtual files generated by the virtual file generating unit to generate an electronic document having a plurality of pages.

6. The electronic document management device according to claim 1, further comprising:

a virtual file coupling unit for coupling the virtual files generated by the virtual file generating unit to generate a virtual file having a plurality of pages.

7. The electronic document management device according to claim 6, wherein the object generating unit generates, as the object, a thumbnail image for a designated page of a designated electronic document based on the attribute information for one specific page in the attribute information possessed by a virtual file having a plurality of pages generated by the virtual file coupling unit.

8. An electronic document management system including a terminal and a server and configured to enable coupling of the terminal and the server through a communication network, the server including:

a virtual file generating unit for designating an optional page of an optional electronic document as selected by a user to generate a virtual file constituted by attribute information representing a storage place of the optional electronic document, a file name of the optional electronic document and a page number of the optional page of the optional electronic document;

an object generating unit for previously generating and storing, in a virtual file storing unit, objects for visualizing and displaying the virtual files for all pages of all electronic documents stored in an electronic document storing unit; and a virtual file access unit for giving access to the optional page of the optional electronic document designated by the virtual file based on the attribute information possessed by the virtual file by selecting the object corresponding to the optional page, and the terminal including:

an object display unit for displaying an objects previously stored in the virtual file storing unit on a display unit in a user selectable form, wherein:

the virtual file generating means displays, on the display means, the objects saved previously and causes a user to select any of the objects, thereby accepting designation of an optional page in an optional electronic document to generate the virtual file;

the virtual file generating unit accepts designation of an optional page in an optional electronic document to generate the virtual file when an object of which the virtual file is not generated is selected by a user.

9. A computer readable electronic document management program which is stored in a non-transitory computer-readable medium for causing a computer to function as:

virtual file generating means for designating an optional page of an optional electronic document as selected by a user to generate a virtual file constituted by attribute information representing a storage place of the optional electronic document, a file name of the optional electronic document and a page number of the optional page of the optional electronic document;

an object generating means for previously generating and storing, in a virtual file storing unit, objects for visualizing the virtual files, for all pages of all the electronic documents stored in an electronic document storing unit;

displaying the object generated by the object generating means on a display unit in a user selectable form; and a virtual file access means for giving access to the optional page of the optional electronic document designated by the virtual file based on the attribute information possessed by the virtual file by selecting the object corresponding to the optional page from among the objects displayed on the display, wherein:

the virtual file generating means accepts designation of an optional page in an optional electronic document to generate the virtual file when an object, of which the virtual file is not generated, is selected by a user from among the objects displayed by the display unit.

* * * * *